O. P. ROBINSON.
VALVE.
APPLICATION FILED JUNE 3, 1913.
1,123,801.
Patented Jan. 5, 1915.
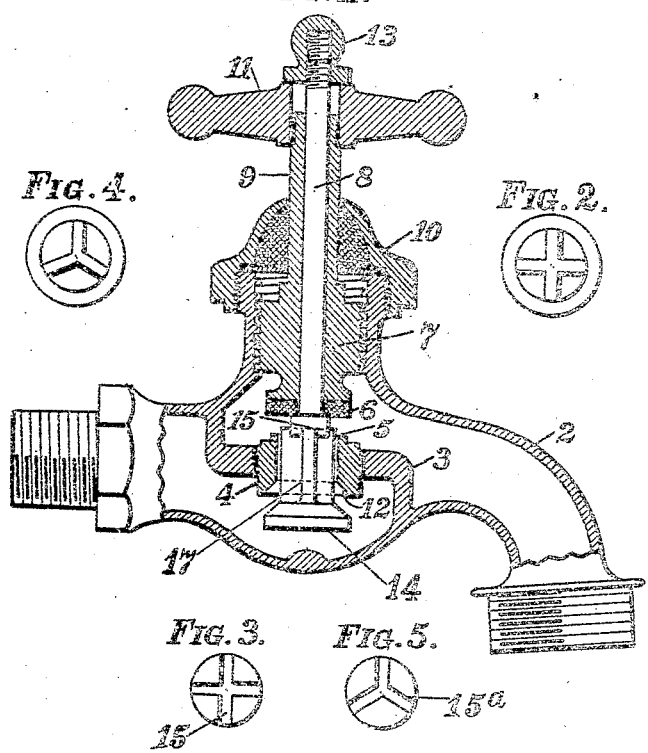
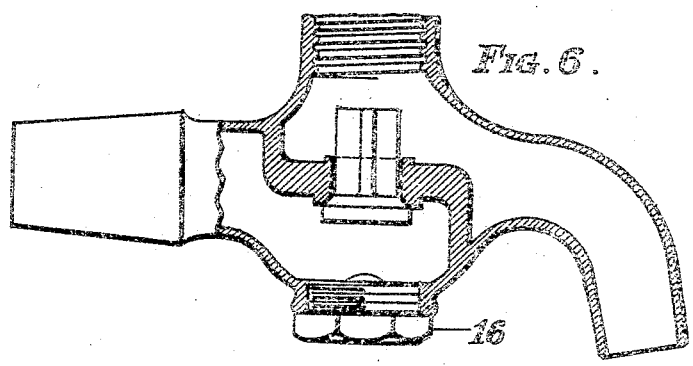
WITNESSES
INVENTOR

UNITED STATES PATENT OFFICE.

ORPHEUS P. ROBINSON, OF PITTSBURGH, PENNSYLVANIA.

VALVE.

Specification of Letters Patent.  Patented Jan. 4, 1915.

Application filed June 9, 1913. Serial No. 771,406.

*To all whom it may concern:*

Be it known that I, ORPHEUS P. ROBINSON, a citizen of the United States, residing at Pittsburgh, in the county of Allegheny and State of Pennsylvania, have invented a new and useful Improvement in Valves, of which the following is a full, clear, and exact description, reference being had to the accompanying drawings, forming part of this specification, in which—

Figure 1 is a side elevation partially in section of a valve to which I have applied one form of my invention. Fig. 2 is a plan view of the check valve shown in Fig. 1. Fig. 3 is an end view of the screw threaded member shown in Fig. 1. Fig. 4 is a plan view of a modified form of check valve. Fig. 5 is an end view of the screw threaded member which is adapted to be used in connection with the check valve shown in Fig. 4, and Fig. 6 is a side elevation partially in section of a modified form of valve or faucet.

This invention relates to valves and is designed to provide a cheap and efficient device having a check valve arranged to automatically shut off water when the screw valve is removed for repairs or for renewing the washers.

Another object of my invention is to provide means for tightening the washer on the lower end of the screw valve without removing the valve from the casing if the washer should become loose and chatter.

A further object is to so shape the wrench or screw driver coöperating recess in the head of the washer securing screw and the wings on the check valve that they will engage each other when brought into register, so that the two valves will rotate in unison and thereby prevent wearing the head of the securing member.

The precise nature of my invention will be best understood by reference to the accompanying drawings, which will now be described, it being premised, however, that various changes may be made in the details of construction and the general arrangement of the parts, without departing from the spirit and scope of my invention, as defined in the appended claims.

In the drawings, the numeral 2 designates the casing of a faucet which is provided with the usual dividing wall 3.

In Fig. 1 of the drawings, I have shown a bushing 4 having a screw threaded engagement with the walls of the such opening through the dividing wall. The upper face of this bushing is provided with a seat 5 which is arranged to be engaged by a washer 6 secured to the lower end of the faucet valve 7 by means of a screw threaded member 8. The valve 7 is provided with the usual screw threads which engage corresponding screw threads in the upper casing. The valve 7 is also provided with an upwardly extending stem 9, which passes through the usual nut 10 on the top of the casing.

11 is a valve operating handle mounted on the upper end of the stem 9. The member 8 passes entirely through the valve 7 and its stem 9, as well as the handle 11. The upper or threaded end of this member 8 is engaged by a nut 12 which is seated against the upper face of the handle 11, so that the washer can be tightened by moving the nut 8 without taking the valve out of the casing.

The lower end of the bushing 5 is provided with a conical seat 13 which is engaged by the conical face of a check valve 14. This check valve is provided with upwardly extending wings 15 which are slidably mounted in the bushing, the upper ends of the wings being arranged to seat in recesses 15 formed in the head of the member 8. These recesses are arranged to be engaged by a wrench or screw driver for releasing the screw 8 when it is desired to replace the washer 6.

In Fig. 5, I have shown the head of the screw threaded member provided with three radially disposed recesses 15ᵃ, while the check valve which is adapted to be used in connection with this screw is provided with three radial wings, as shown in Fig. 4.

In Fig. 6, I have shown a modified faucet, which is provided with an opening through the bottom of the casing, which is sealed by means of a screw plug 16.

In the arrangement shown in Fig. 1, the check valve is first placed in position through the opening in the upper end of the casing, the bushing 5 is then screwed into position, and the valve 7, together with the cap 10, are then placed in position.

In the construction shown in Fig. 6, the faucet valve is placed in position in the usual manner and the check valve is placed in position through the opening in the bottom of the casing. This opening is then closed by screwing the plug 16 into position.

When it is desired to renew the washer 6, the valve 7 is turned to its raised position, and the water passing through the faucet will now move the check valve upwardly. The cap 10, together with the valve, is then removed from the casing and the flow of water is stopped by means of the check valve 14. After the washer has been replaced the parts are again assembled, and as the valve 7 is moved downwardly, the recesses 15 in the lower end of the screw engage the wings on the check valve, so that the latter will be rotated with the valve 7 during the further downward movement. This engagement between the recesses in the head of the screw and the wings of the check valve prevents wearing the head, which would occur if the ordinary screw were used for securing the washer 6 in position. The frictional engagement between the check valve and the head of the screw would soon wear the head so that it would be impossible to remove the screw by means of a screw driver. If the washer 6 should become loose the nut 13 can be adjusted to secure the washer.

The advantages of my invention result from the provision of a member for securing the usual washer in position, which member extends through the washer, the valve and the valve stem, and which is secured in position by means of a nut engaging the threaded end of the member; further from the provision of a member having its head recessed to form a seat for the wings of a check valve to prevent wearing or cutting away the head of the screw by frictional engagement with the check valve when the main valve is rotated.

I claim:

1. A cut off comprising a casing having a dividing wall therein provided with a horizontal portion, there being an opening through said horizontal portion, valve seats on opposite sides of the wall surrounding the opening, a check valve for engaging the lower valve seat, a faucet valve mounted in the casing above the dividing wall, a washer on the lower end of said valve for engaging the upper seat, a washer securing member connected to said faucet valve, said faucet valve being arranged to be moved upwardly a sufficient distance to permit the check valve to engage its seat to close the passage through the dividing wall, there being registering interlocking means on the washer securing member and the check valve adapted to engage each other when the faucet valve has been moved downwardly a predetermined distance, to rotate the check valve and move it downwardly away from its seat, substantially as described.

2. A cut off comprising a casing having a dividing wall therein provided with a horizontal portion, there being an opening through said horizontal portion, valve seats on opposite sides of said wall surrounding said opening, a check valve for engaging the lower seat and having upwardly extending wings slidably mounted in the opening in the dividing wall, a faucet valve, a washer on the lower end of said faucet valve for engaging the upper seat, a screw threaded member for securing said washer to the faucet valve extending through the valve, said member having recesses arranged to register with the wings on the check valve, and a nut on the upper end of said member for securing the washer to the faucet valve; substantially as described.

In testimony whereof, I have hereunto set my hand.

ORPHEUS P. ROBINSON.

Witnesses:
 GEORGE L. ROBINSON,
 JESSE B. HELLER.